(12) United States Patent
Eick et al.

(10) Patent No.: US 9,250,336 B2
(45) Date of Patent: Feb. 2, 2016

(54) SIMULTANEOUS CONVENTIONAL AND PHASE-ENCODED SEISMIC ACQUISITION

(75) Inventors: Peter M. Eick, Houston, TX (US); Joel D. Brewer, Houston, TX (US); Stephen K. Chiu, Katy, TX (US)

(73) Assignee: ConocoPhillips Company, Houston, TX (US)

( * ) Notice: Subject to any disclaimer, the term of this patent is extended or adjusted under 35 U.S.C. 154(b) by 958 days.

(21) Appl. No.: 13/451,970

(22) Filed: Apr. 20, 2012

(65) Prior Publication Data

US 2012/0275266 A1    Nov. 1, 2012

Related U.S. Application Data

(60) Provisional application No. 61/480,777, filed on Apr. 29, 2011.

(51) Int. Cl.
*G01V 1/00* (2006.01)
(52) U.S. Cl.
CPC ........................ *G01V 1/005* (2013.01)
(58) Field of Classification Search
CPC .................................................... G01V 1/005
See application file for complete search history.

(56) References Cited

U.S. PATENT DOCUMENTS

| | | | |
|---|---|---|---|
| 3,885,225 A | 5/1975 | Anstey et al. | |
| 4,715,020 A | 12/1987 | Landrum, Jr. | |
| 2006/0164916 A1 | 7/2006 | Krohn et al. | |
| 2014/0362659 A1* | 12/2014 | Tsingas | 367/14 |

FOREIGN PATENT DOCUMENTS

GB    2306219    4/1997

* cited by examiner

*Primary Examiner* — Krystine Breier
(74) *Attorney, Agent, or Firm* — ConocoPhillips Company

(57) ABSTRACT

The invention relates to a process for two separate seismic crews to work in proximity to one another that would otherwise require expensive time sharing where one crew is a conventional seismic acquisition system and the other is a phase encoded seismic acquisition system. Typically, each recording system would receive seismic energy from the other that neither data set would be very useful. The invention primarily envisions some collaboration between the crews where each adjusts its sweeps to comprise a different time duration so that the energy the other crew's sources are distinguishable in the data set and easily eliminated therefrom. Distinctions may be further enhanced when the two crews use construct their sweeps so that each crew has a distinctly different start frequency and a distinctly different end frequency.

5 Claims, 2 Drawing Sheets

SIMULTANEOUS CONVENTIONAL AND PHASE-ENCODED SEISMIC ACQUISITION

CROSS-REFERENCE TO RELATED APPLICATIONS

This application is a non-provisional application which claims benefit under 35 USC §119(e) to U.S. Provisional Application Ser. No. 61/480,777 filed Apr. 29, 2011, entitled "SIMULTANEOUS CONVENTIONAL AND PHASE ENCODED SEISMIC ACQUISITION," which is incorporated herein in its entirety.

STATEMENT REGARDING FEDERALLY SPONSORED RESEARCH

None.

FIELD OF THE INVENTION

This invention relates to seismic prospecting for hydrocarbon resources and especially to acquisition of seismic data using sweep-type seismic sources.

BACKGROUND OF THE INVENTION

In the process of acquiring seismic data, a crew is typically deployed across several square miles of a survey area positioning cables and seismic receivers while seismic sources move from predetermined point to predetermined point to deliver vibrational seismic energy into the earth. The receivers capture the reflected signals that are recorded and subsequently processed to develop images of geologic structures under the surface.

Occasionally, two crews will end up working survey areas that are sufficiently close that recordings in one survey area will include seismic energy delivered in the other survey area. As both crews try to acquire useful seismic data, both typically end up with obscured data that is difficult to process and unhelpful for resolving the subsurface geology. Typically, when these situations arise, the crews end up time sharing such that only one crew is permitted to deliver seismic energy at any moment in time. While the data is much more useful and valuable, the time for acquiring the data is prolonged and much more costly.

Phase encoded seismic sweeps by sweep vibrators on separate source points, sometimes described as Zenseis® seismic prospecting, increases seismic survey productivity over conventional seismic by acquiring data at several source points at the same time. If two phase encoded surveys are being conducted at the same time in close proximity, as long as the start times for each sweep are reasonably separated and the phase encoding of each crew is optimally tuned, each may generally proceed without time sharing. However, a conventional seismic survey crew receives the phase encoded sweeps as significant noise and, heretofore, have not been able to proceed when another crew is in the area.

BRIEF SUMMARY OF THE DISCLOSURE

The invention more particularly includes a process for conducting two adjacent seismic surveys in close proximity and concurrently where each survey utilizes multiple sweep type seismic vibrators and where one survey is conducted with the seismic vibrators using sweeps of about twice the length of time or longer as the sweeps of the seismic vibrators of the other survey.

In one embodiment, one survey is shaking one shot point at a time while the other shakes multiple shot points concurrently. The sweeps may begin at first frequency and end at a second frequency and progress from the first to the second wherein the first frequency of one survey is at least five percent different than the first frequency of the other survey. The second frequency of one survey may be at least five percent different than the second frequency of the other survey. Additionally, one survey may utilize an upsweep while the other utilizes a downsweep.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
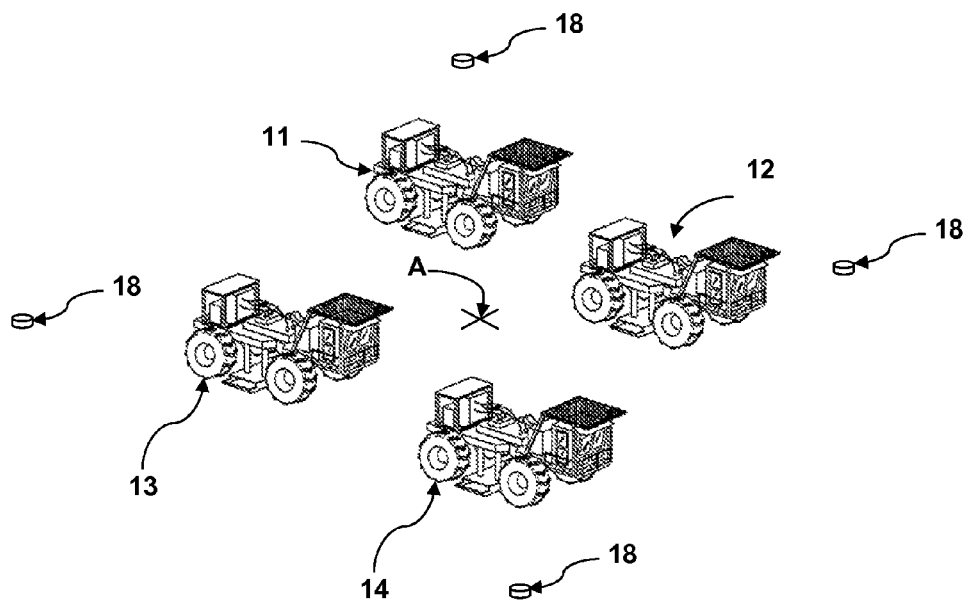
FIG. 1 is perspective view of a first seismic crew acquiring data in a conventional manner.

An example of a conventional seismic survey crew is shown in FIG. 1, where a team 10 of four sweep vibes 11, 12, 13, and 14 are arrayed around a shot point A and a plurality of receivers 18 are set to record the signals arriving back to the surface after reflecting off of subsurface structures. In the data set, all the energy put into the ground by the team 10 are seen as from the single point and may be essentially summed to be equivalent to one very big vibe. The team 10 will move together from shot point to shot point until every shot point in the survey has been shaken. The source points may be arranged in a variety of arrays depending on the paradigms of the designing geophysicist.

Figure 2:
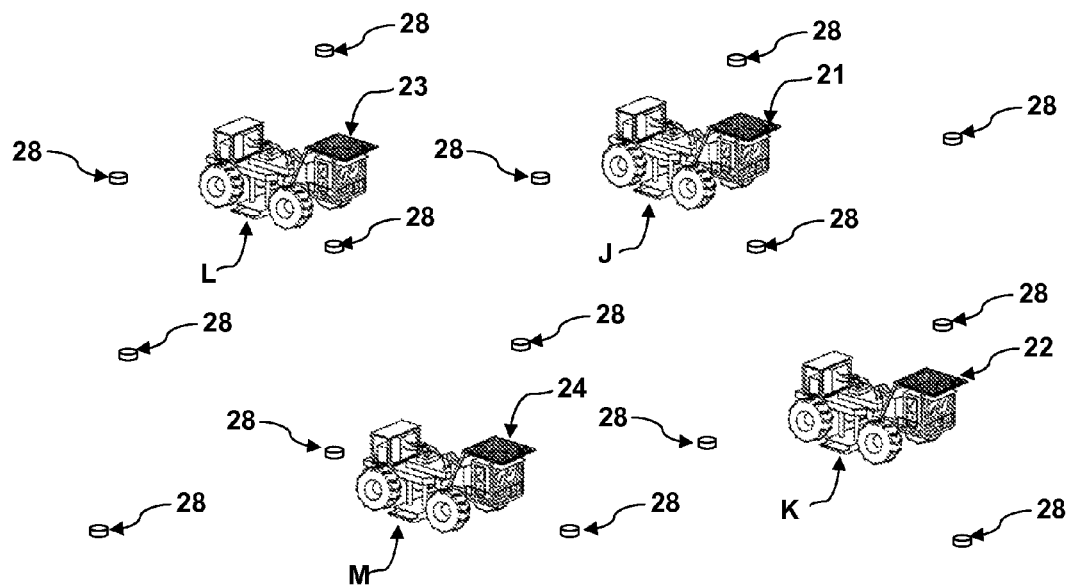
FIG. 2 is a perspective view of a second seismic crew acquiring data in a phase encoded manner.

In FIG. 2, a phase encoded seismic survey team 20 is shown with four vibes 21, 22, 23 and 24 each setting on shot points J, K L and M while a plurality of receivers are set to record the signals arriving back to the surface. The data recorded at each receiver 28 includes the energy from each of the shot points J, K, L, and M. Thus, four shot points are surveyed at the same time and the phase encoding of each source provides for subsequent separation of the data so that interpretations of the subsurface geology may be made based on data from each shot point to each receiver point. The goal of phase encoded seismic surveying is to create the same data set as acquired by a conventional seismic survey team, but in significantly less time. Thus, it should be noted that with four vibes on one shot point will essentially put four times the energy into the ground in a set period of time as one vibe. Thus, in the phase encoded survey, the vibes spend more time delivering energy into the ground at each shot point as the vibe. Typically, a phase encoded seismic survey team with 4 vibes will deliver at least four sweeps of distinctly longer length in time than a conventional survey team will deliver. Simply stated, if a conventional survey were to have four vibes provide a common set of four sweeps of 10 seconds each for each shot point, a phase encoded seismic survey team would have each vibe deliver at least four 20 second sweeps or 80 total seconds of energy.

Turning to the issue of conflicts between two crews in close proximity to one another, seismic receivers are not discriminatory in what signals are received and recorded. A conventional seismic survey crew has no practical way of separating out stray signals from other crews, especially if the other crews are close enough that the signals received are of comparable intensity to their own signals. The energy from four vibes in a nearby phase encoded seismic survey team is comparable to the energy of four vibes in a conventional survey. However, the data recorded at each receiver point in the conventional survey will be contaminated with information from the vibes in the phase encoded survey. Without information about the phase encoding and the start time, the identification of the separate vibes is at least impractical and is more accurately described as practically impossible. At the same time, the conventional seismic crew will be contaminating the phase encoded survey, but the energy from the conventional vibes is typically easier to identify, especially once there are many sweeps. Moreover, with successive sweeps and the total energy of the sweeps delivered over a longer time leads mathematically to stacking out of the errant data and retention of sufficient useful data.

The inventive process comprises cooperation from the adjacent crews and some tailoring of the sweeps to be used. For example, a sweep is characterized by a starting frequency and ending frequency, and a sweep duration. The moment a sweep starts is also helpful information to separate sweeps. Most sweeps are upsweeps, but using down sweeps for one crew while the other uses upsweeps with further characterize the sweeps for distinction in the data record for both crews. So, if one crew starts its sweeps at about 4 hertz while the other starts at 10 hertz, and one sweeps quickly to an upper frequency of, for example, sweeps to 75 hertz in 10 seconds while the other sweeps to 85 hertz in 24 seconds, the return echoes from the vibes of one crew will appear distinctive from the other. Thus, both crews can continue to gather seismic data in what previously had been too close for concurrent operations.

Figure 3:
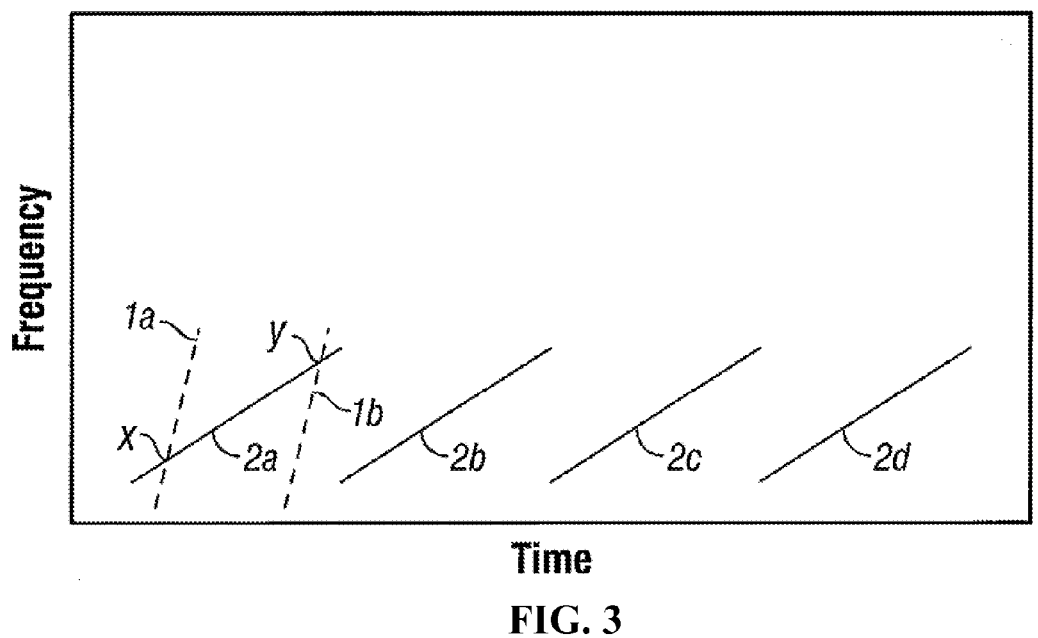
FIG. 3 is a diagram illustrating hypothetical sweeps of the two survey teams shown in FIGS. 1 and 2 to point out how the sweeps may be distinguished and thus, where the two crews may continue to gather seismic data without interfering with one another.

Turning to FIG. 3, a chart presents a first hypothetical set of sweeps for the conventional crew "1" and the phase encoded crew "2". The phase encoded crew will conduct four sweeps 2a, 2b, 2c and 2d of 16 seconds starting at 9 hertz to 65 hertz while the conventional crew will conduct two sweeps 1a and 1b of 8 seconds in length starting at 4 hertz and ending at 72 hertz. In this arrangement, the sweeps will overlap in at most two places, labeled "X" and "Y", and for only a brief moment in time. At the overlap points, the data will be suspect, but it is unlikely that both X and Y will be at the same frequency. Thus, at the overlap frequency X, the data from the sweep 1b will provide the gap filling data. The sweep 1a will provide the data for the overlap frequency Y. It should also be noted that each crew will require time to move the vibes from point to point. It is expected that a lot of seismic data for each crew will be gathered while the other is moving its vibes.

One aspect that should be noted is that with the phase encoded system, the vibes will spend more time on each shot point and will therefore not be able to move to as many shot points in a single day as a conventional survey. However, each vibe in a phase encoded survey provides the energy, by itself, for each shot point. Thus, when the vibes move in a phase encoded survey, four shot points are completed versus a single shot point in a conventional survey. Thus, it should be easily seen that a phase encoded survey is a much more productive and ultimately time efficient survey.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 3,885,225, "Broad line seismic profiling." Anstey and Taner, Seiscom Delta Inc. (1975).
2. U.S. Pat. No. 4,715,020, "Simultaneous performance of multiple seismic vibratory surveys." Landrum, Western Atlas Int. Inc. (1987).
3. GB 2 306 219, "3-D seismic survey using multiple sources simultaneously." Nigel Allister Anstey (1997).
4. US 2006/0164916, "Method for continuous sweeping and separation of multiple seismic vibrators." Krohn and Johnson, ExxonMobil Upstream Res. (2003).

The invention claimed is:

1. A process for conducting two adjacent seismic surveys in close proximity and concurrently where each survey utilizes multiple sweep-type seismic vibrators and where one survey is conducted with the seismic vibrators using sweeps of about twice the length of time or longer as the sweeps of the seismic vibrators of the other survey.

2. The process for conducting two adjacent seismic surveys in close proximity and concurrently according to claim 1 where one survey is shaking one shot point at a time while the other shakes multiple shot points concurrently.

3. The process for conducting two adjacent seismic surveys in close proximity and concurrently according to claim 2 wherein the sweeps begin at first frequency and end at a second frequency and progress from the first to the second wherein the first frequency of one survey is at least five percent different than the first frequency of the other survey.

4. The process for conducting two adjacent seismic surveys in close proximity and concurrently according to claim 3, wherein the second frequency of one survey is at least five percent different than the second frequency of the other survey.

5. The process for conducting two adjacent seismic surveys in close proximity and concurrently according to claim 2 wherein one survey utilizes an upsweep while the other utilizes a downsweep.

* * * * *